United States Patent [19]

Bitterli et al.

[11] Patent Number: 4,494,955
[45] Date of Patent: Jan. 22, 1985

[54] MASS DYEING OF POLYESTER WITH PYRROCOLINE DYE OF HIS THERMAL STABILITY

[75] Inventors: Peter Bitterli, Reinach; Bansi L. Kaul, Biel-Benken, both of Switzerland

[73] Assignee: Sandoz Ltd., Basel, Switzerland

[21] Appl. No.: 549,076

[22] Filed: Nov. 7, 1983

[30] Foreign Application Priority Data

Nov. 10, 1982 [DE] Fed. Rep. of Germany ....... 3241494

[51] Int. Cl.³ .......................... C08J 3/20; C08K 5/34; C08L 67/02; C09B 57/00
[52] U.S. Cl. ............................................. 8/512; 8/583; 8/637; 8/638; 8/650; 8/696; 8/922
[58] Field of Search ............................ 8/650, 512, 583

[56] References Cited

U.S. PATENT DOCUMENTS 2,772,274 11/1956 Schmidt-Nickels ................. 546/73
2,863,714 12/1958 Long et al. ............................. 8/583
4,042,591 8/1977 Kaul ....................................... 8/650

FOREIGN PATENT DOCUMENTS 1034295 3/1965 United Kingdom .
1042636 9/1966 United Kingdom .
1067244 5/1967 United Kingdom .
1076482 7/1967 United Kingdom .

Primary Examiner—A. Lionel Clingman
Attorney, Agent, or Firm—Gerald D. Sharkin; Richard E. Vila; Thomas C. Doyle

[57] ABSTRACT

Disclosed is mass-dyed polyester comprising, as dyestuff, a compound or mixture of compounds of formula I

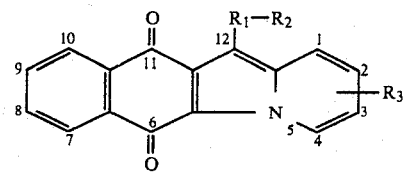

wherein $R_1$ is a direct bond, —CONH— or —NHCO—, $R_2$ is alkyl, phenyl or naphthyl, optionally substituted or cyano, provided that $R_1$ is a direct bond when $R_2$ is cyano, and $R_3$ is hydrogen, methyl, ethyl, alkoxy-$C_{1-3}$-carbonyl or —CH=CH—CH=CH— bound in the 1,2-position.

20 Claims, No Drawings

MASS DYEING OF POLYESTER WITH PYRROCOLINE DYE OF HIS THERMAL STABILITY

The present invention relates to mass-dyed polymeric material, particularly spin mass-dyed linear, aromatic polyester.

The invention provides mass-dyed polyester comprising, as dyestuff a compound or a mixture of compounds of formula I

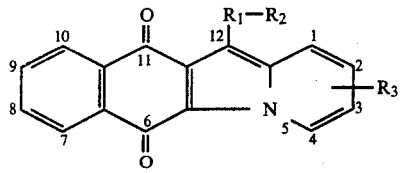

wherein
$R_1$ is a direct bond, —CONH— or —NHCO—,
$R_2$ is $C_{1-4}$alkyl; $C_{1-4}$alkyl mono-substituted by chlorine, bromine or $C_{1-3}$alkoxy; phenyl or naphthyl; phenyl or naphthyl substituted by up to two substituents selected from chlorine, bromine, methyl, methoxy, nitro, cyano, carboxy and alkoxy-$C_{1-3}$-carbonyl; or cyano provided that $R_1$ is a direct bond when $R_2$ is cyano and
$R_3$ is hydrogen; methyl; ethyl; alkoxy-$C_{1-3}$-carbonyl; or —CH=CH—CH=CH— bound in the 1,2-position.

The compounds of formula I are particularly suitable for the spin mass dyeing of linear, aromatic polyester fibre material. Some compounds of formula I are known and are disclosed as insoluble compounds e.g. as vat dyestuffs in U.S. Pat. No. 2,722,274 or as pigments in British Pat. No. 1 076 482. It has now been found that the compounds of formula I are substantially soluble in the polyester mass, i.e. they are present in dissolved form in the polyester. This property is particularly interesting in the case of spin dyeing since clogging of the nozzles or filters do not occur.

Furthermore the present invention also provides a method for producing mass-dyed polyester material comprising dissolving in the polyester or in the polyester precursors a compound or a mixture of compounds of formula I, as stated above, and uniformly distributing it throughout and in the case of the polyester precursors carrying out or completing the polycondensation reaction. By polyester "precursors" is to be understood either the corresponding monomeric material or precondensates of the monomeric material.

In the compounds of formula I, when $R_2$ is $C_{1-4}$alkyl, it is preferably unsubstituted. When $R_2$ is naphthyl, it is preferably unsubstituted naphthyl.

When $R_1$ is a direct bond and $R_2$ is alkyl, $R_2$ is preferably unsubstituted $C_{1-3}$alkyl.

When $R_1$ is a direct bond and $R_2$ is phenyl, $R_2$ is preferably unsubstituted phenyl or phenyl substituted by up to two substituents selected from chlorine, bromine, methyl and methoxy.

When $R_2$ is monosubstituted phenyl, the substituent is preferably in the para position. When $R_2$ is disubstituted phenyl, the two substituents are preferably in the 2,4 position of the phenyl ring.

$R_1$ is preferably $R_1'$, where $R_1'$ is —CONH— or a direct bond.

$R_2$ is preferably $R_2'$ where $R_2'$ is unsubstituted phenyl, phenyl bearing up to two substituents selected from chlorine, bromine, nitro, methyl and methoxy, or cyano with the proviso that $R_1$ or $R_1'$ is a direct bond when $R_2$ or $R_2'$ is cyano.

$R_3$ is preferably $R_3'$, where $R_3'$ is hydrogen, methyl (more preferably in the 3-position) or —CH=CH—CH=CH— bound in the 1,2 position.

Preferably the mass-dyed polyester of the invention comprises as dyestuff a compound or a mixture of compounds of formula Ia

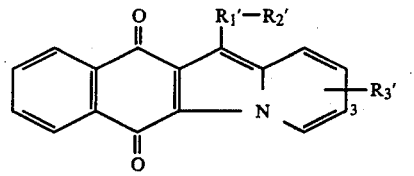

wherein $R_1'$, $R_2'$ and $R_3'$ are as defined above.

Further preferred compounds of formula Ia are those wherein $R_1'$ is —CONH—, $R_2'$ is unsubstituted phenyl or phenyl monosubstituted by chlorine or methyl and $R_3'$ is hydrogen or methyl preferably in the 3-position.

The compounds of formula I are known compounds or may be produced from available starting materials in analogous manner to known methods.

According to the invention, mass-dyed polyester material includes linear, aromatic polyester, preferably of a high molecular weight, for example linear polymers or polycondensates obtained from aromatic dicarboxylic acids, such as terephthalic acid or isophthalic acid, with aliphatic dihydroxy compounds, such as ethylene glycol, 1,4-dihydroxy-butane and 1,4-cyclohexanediol. Preferred polyesters of this type are polybutylene terephthalate, poly(cyclohexanediol-terephthalate), poly-ε-caprolactone and more particularly polyethylene glycol terephthalate.

The mass-dyeing is suitably carried out in conventional manner, using the dyestuffs of formula I alone or mixed with each other or with one or more other dyestuffs indicated for the mass-dyeing of polymeric materials. The dyestuffs may be purified and ground in conventional manner prior to their incorporation.

A preferred method of producing the mass-dyed polyester material according to the invention is first to mix the dyestuff generally in an amount of 15 to 60% by weight, with a part of polyester material to be mass-dyed, preferably 85 to 40% by weight, to form a concentrate referred to as "master-batch" and then adding this master-batch in the desired amount, depending on the depth of colour required in the final polyester material, to the polyester material and distributing the dyestuff throughout the polyester material. Such master-batches or concentrated compositions also form part of the invention.

The mixing of the dyestuff with the polyester material to prepare the master-batch is suitably effected e.g. by mixing and grinding both the dyestuff and the polyester, preferably a relatively low-melting, linear, aromatic polyester, e.g. having a melting range in the range from 75° to 230° C., together to form a fine powder and, optionally processing the powder through an extruder and forming chips or granulate from the extrudate. The mixing and grinding of the dyestuff with the polyester material is preferably carried out at a low temperature, e.g. employing dry ice as coolant.

The master batch may be added either in powder, chip or granulate form to the undyed polyester material, or in molten form to the molten polyester material, preferably to the polyester mass to be spun.

After addition of the master-batch to the polyester material, the resulting mix can be formed into shaped articles, such as films or foils or, preferably, fibres or filaments, in conventional manner, e.g. by extrusion or spinning techniques, and such articles further processed, e.g. into yarn, cord, rope, woven, non-woven and knitted goods, or the mix can be formed into granules or chips for subsequent melting and formation into such shaped articles.

According to a particularly preferred embodiment of the process of the invention, the compounds of formula I are incorporated per se or in the form of a master batch into the unpolymerized or polyester precondensates, and the polycondensation carried out or completed in the presence of the dye at a temperature of e.g. 250°–300° C. up to 6 hours in vacuo (0.1 Torr).

The mass-dyed polyester material according to the invention has good allround fastness properties, e.g. to light, migration, vehicle exhaust fumes, ozone and sublimation, as well as good wet fastness and stability in thermofixation. Of particular interest, however, is the fact that the compounds of formula I show very good resistance to extreme conditions, particularly to high temperatures as employed in extrusion and especially spinning operations e.g. 275° C. Not only are the compounds of formula I soluble in polyesters, they also exhibit such a good thermostability that they can be incorporated prior to or during the polymerization or polycondensation of the polyesters, and are not decomposed even after several hours at condensation temperatures (e.g. 250°–300° C. up to 6 hours in vacuo).

The following Examples in which all parts and percentages are by weight and all temperatures in degrees Centigrade, illustrate the invention.

EXAMPLE 1

1 000 Parts of a commercial polyester formed by condensation of terephthalic acid and ethylene glycol are ground in a pin mill to a powder whose particles have a diameter of between 300 and 600μ. This polyester powder is mixed well at room temperature in a closed mixer with 150 parts of a dyestuff of formula I wherein $R_1 = $ —CONH—, $R_2 = $ phenyl and $R_3 = $ hydrogen. This mixture is subsequently processed in an extruder at 250° to form a cable which is then cut to a granulate.

The dyestuff concentrate, produced as described above, is melted in the secondary feed line of a helical spinning machine and is added at 270°–275° by a metering device to commercial, linear, aromatic polyester (polyethylene terephthalate) heated with the primary feed of the spinning machine. The metering device adds to the polyester feed 4 parts of dyestuff concentrate per 48 parts of polyethylene terephthalate. The mixture is then spun at 270°–275° at a wind-up speed of 200 meters per minute, the spun fibres are stretched at 90° in a drawing machine in the ratio of 1:4 and are twisted in the usual manner in a ring twister. A red mass-dyed yarn is thus obtained with good fastness properties.

The dyestuff used above may be prepared for example according to Example 5 of U.S. Pat. No. 2,722,274.

EXAMPLE 2

1 360 Parts ethylene glycol and 1 700 parts dimethyl terephthalate were stirred with 0.55 parts manganese acetate for 3½ hours at 180° and the methanol produced was distilled off.

The mass is then transferred to a vacuum container suitable for polycondensation and a mixture of 80 parts ethylene glycol, 0.45 parts antimony trioxide, 2.0 parts trinonylphenyl phosphite and 17 parts of the dyestuff used in Example 1 is added to the mass while stirring. The mixture is heated to 275° whereby the vacuum in successively increased to 1 Torr until the intrinsic viscosity of $\eta = 0.70$ is reached by distillation of ethylene glycol (about 4 to 6 hours).

The dyed polyester obtained is then extruded into water to cool and is granulated. The granules are vacuum dried at 140° for 16 hours and finally spun, stretched and twisted as described in Example 1. A red yarn with good properties is obtained.

Following the above procedures but replacing the dyestuff used therein with a dyestuff of formula I as specified in the Table below, there are obtained mass-dyed yarns having the shade indicated in the Table with good fastness properties.

TABLE

| Example No. | $R_1$ | $R_2$ | $R_3$ | Shade |
|---|---|---|---|---|
| 3 |  | —CN | 1-CH=CH—CH=CH-2 | orange-yellow |
| 4 | —CONH— | —C$_6$H$_5$ | " | " |
| 5 | " | —C$_6$H$_4$—Cl(4) | " | " |
| 6 | " | —C$_6$H$_4$—NO$_2$(4) | " | " |
| 7 | " | —C$_6$H$_4$—Cl(4) | H | red |
| 8 | " | " | (3)-CH$_3$ | " |
| 9 | " | —C$_6$H$_4$—CH$_3$(4) | H | " |
| 10 | " | —C$_6$H$_3$(CH$_3$)$_2$(2,4) | H | " |
| 11 | " | —C$_6$H$_5$ | H | " |

What is claimed is:

1. Mass-dyed polyester having dissolved therein, as dyestuff, a compound or a mixture of compounds of formula I

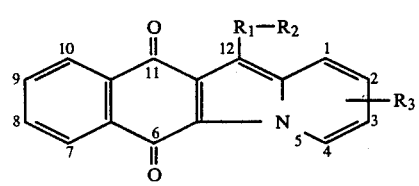

wherein $R_1$ is a direct bond, —CONH— or —NHCO—, $R_2$ is C$_{1-4}$alkyl; C$_{1-4}$alkyl mono-substituted by chlorine, bromine or C$_{1-3}$alkoxy; phenyl or naphthyl; phenyl or naphthyl substituted by up to two substituents selected from chlorine, bromine, methyl, methoxy, nitro, cyano, carboxy and alkoxy-C$_{1-3}$-carbonyl; or cyano provided that $R_1$ is a direct bond when $R_2$ is cyano and $R_3$ is hydrogen; methyl; ethyl; alkoxy-$C_{1-3}$-carbonyl; or —CH=CH—CH=CH— bound in the 1,2-position.

2. Mass-dyed polyester according to claim 1 having dissolved therein, as dyestuff, a compound or a mixture of compounds of formula Ia

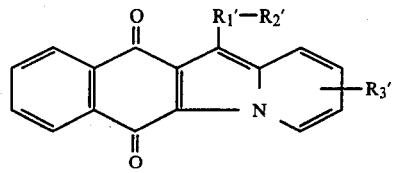

wherein $R_1'$ is —CONH— or a direct bond $R_2'$ is unsubstituted phenyl; phenyl bearing up to two substituents selected from chlorine, bromine, nitro, methyl and methoxy; or cyano with the proviso that $R_1'$ is a direct bond when $R_2'$ is cyano and $R_3'$ is hydrogen, methyl or —CH=CH—CH=CH— bound in the 1,2-position.

3. Mass-dyed polyester according to claim 2 having dissolved therein, as dyestuff, a compound or a mixture of compounds of formula Ia wherein $R_1'$ is —CONH—, $R_2'$ is unsubstituted phenyl or phenyl monosubstituted by chlorine or methyl and $R_3'$ is hydrogen or methyl.

4. Mass-dyed polyester according to claim 1 having dissolved therein, as dyestuff, a compound of formula

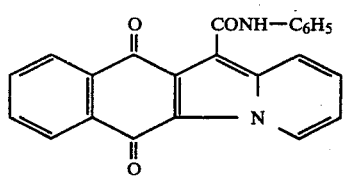

5. Mass-dyed polyester according to claim 1 in the form of spun filaments.

6. A process for producing mass-dyed polyester according to claim 1, comprising dissolving in the polyester or in the polyester precursors a compound or a mixture of compounds of formula I and uniformly distributing it throughout and in the case of the polyester precursors carrying out or completing the polycondensation reaction.

7. A composition comprising from 15 to 60% by weight of a compound of formula I

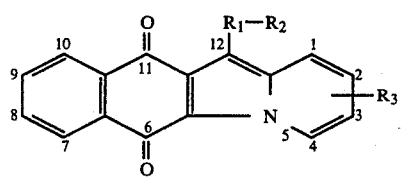

wherein $R_1$ is a direct bond, —CONH— or —NHCO—, $R_2$ is $C_{1-4}$alkyl; $C_{1-4}$alkyl mono-substituted by chlorine, bromine or $C_{1-3}$alkoxy; phenyl or naphthyl; phenyl or naphthyl substituted by up to two substituents selected from chlorine, bromine, methyl, methoxy, nitro, cyano, carboxy and alkoxy-$C_{1-3}$-carbonyl; or cyano provided that $R_1$ is a direct bond when $R_2$ is cyano and $R_3$ is hydrogen; methyl; ethyl; alkoxy-$C_{1-3}$-carbonyl; or —CH=CH—CH=CH— bound in the 1,2-position in dissolved from and 85 to 40% by weight of polyester.

8. Mass-dyed polyester according to claim 1 wherein, in formula I, when $R_2$ is $C_{1-4}$alkyl or naphthyl it is unsubstituted.

9. Mass-dyed polyester according to claim 1 wherein the polyester is polybutylene terephthalate, poly(cyclohexanediolterephthalate), poly-ε-caprolactone or polyethylene glycol terephthalate.

10. Mass-dyed polyester according to claim 2 wherein the polyester is polyethylene glycol terephthalate.

11. Mass-dyed polyester according to claim 3 wherein the polyester is polyethylene glycol terephthalate.

12. Mass-dyed polyester according to claim 4 wherein the polyester is polyethylene glycol terephthalate.

13. A process according to claim 6 wherein the compound or mixture of compounds of formula I comprises a compound or mixture of compounds of formula Ia

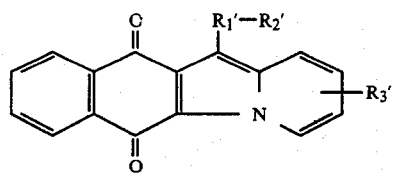

wherein $R_1'$ is —CONH— or a direct bond $R_2'$ is unsubstituted phenyl; phenyl bearing up to two substituents selected from chlorine, bromine, nitro, methyl and methoxy; or cyano with the proviso that $R_1'$ is a direct bond when $R_2'$ is cyano and $R_3'$ is hydrogen, methyl or —CH=CH—CH=CH— bound in the 1,2-position.

14. A process according to claim 6 which comprises mixing the compound or mixture of compounds of formula I with part of the polyester to be mass-dyed to form a master batch containing 15 to 60%, by weight, compound(s) of formula I and 85 to 40%, by weight, polyester, and then adding the master batch, in an amount sufficient to give the desired depth of color, to additional polyester and distributing the compound(s) of formula I therethrough.

15. A process according to claim 6 which comprises incorporating the compound(s) of formula I into unpolymerized or precondensed polyester precursors and effecting polycondensation of said precursors in the presence of the compound(s) of formula I to produce mass-dyed polyester.

16. A process according to claim 13 which comprises mixing the compound or mixture of compounds of formula Ia with part of the polyester to be mass-dyed to form a master batch containing 15 to 16%, by weight, compound(s) of formula Ia and 85 to 40%, by weight, polyester, and then adding the master batch, in an amount sufficient to give the desired depth of color, to additional polyester and distributing the compound(s) of formula Ia therethrough.

17. A process according to claim 13 which comprises incorporating the compound(s) of formula Ia into unpolymerized or precondensed polyester precursors and effecting polycondensation of said precursors in the presence of the compound(s) of formula Ia to produce mass-dyed polyester.

18. A process according to claim 6 wherein the polyester is polybutylene terephthalate, poly-(cyclohexanediolterephthalate), poly-$\epsilon$-caprolactone or polyethylene glycol terephthalate.

19. A process according to claim 14 wherein the polyester is polyethylene glycol terephthalate.

20. A process according to claim 15 wherein the polyester is polyethylene glycol terephthalate.

* * * * *